UNITED STATES PATENT OFFICE.

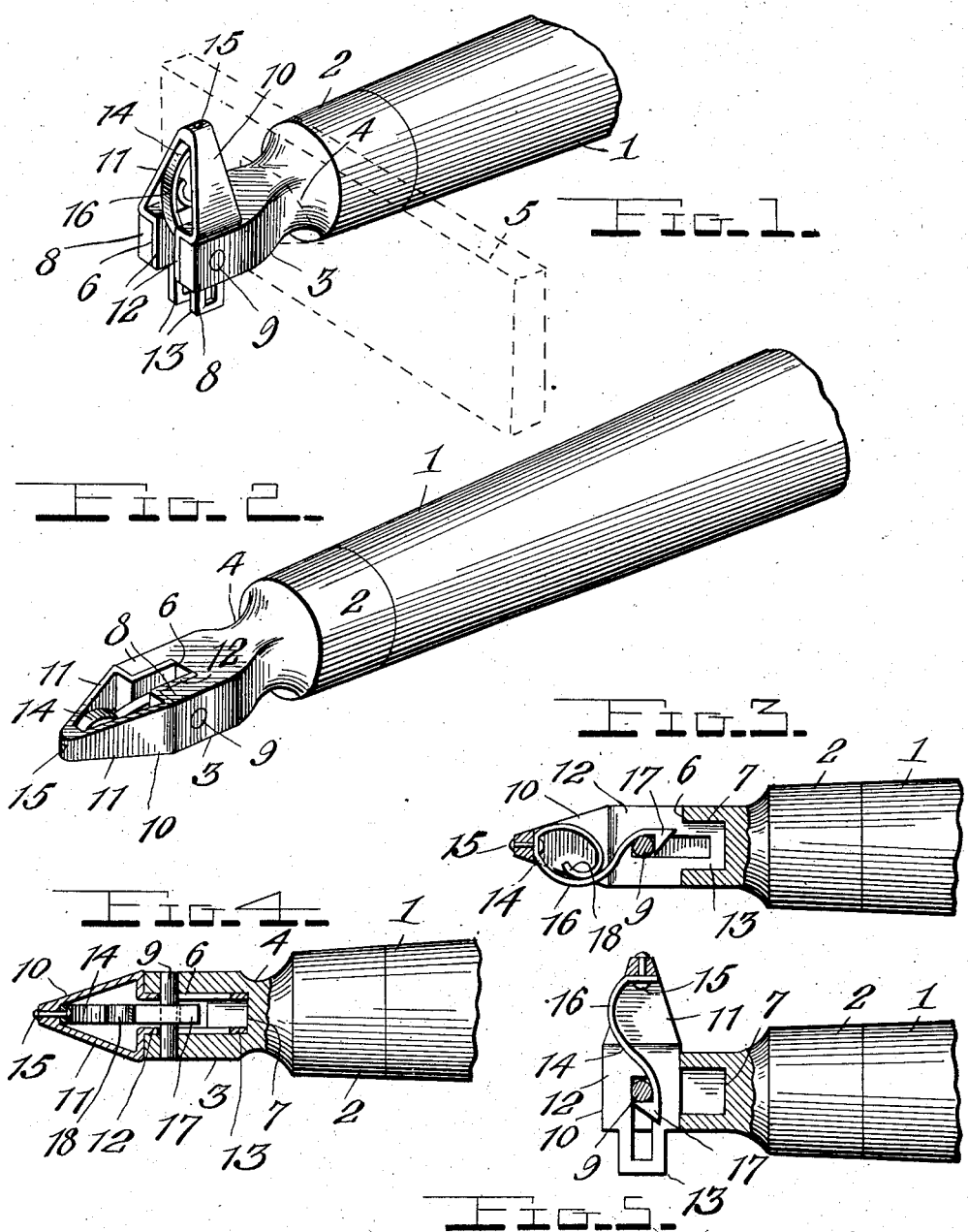

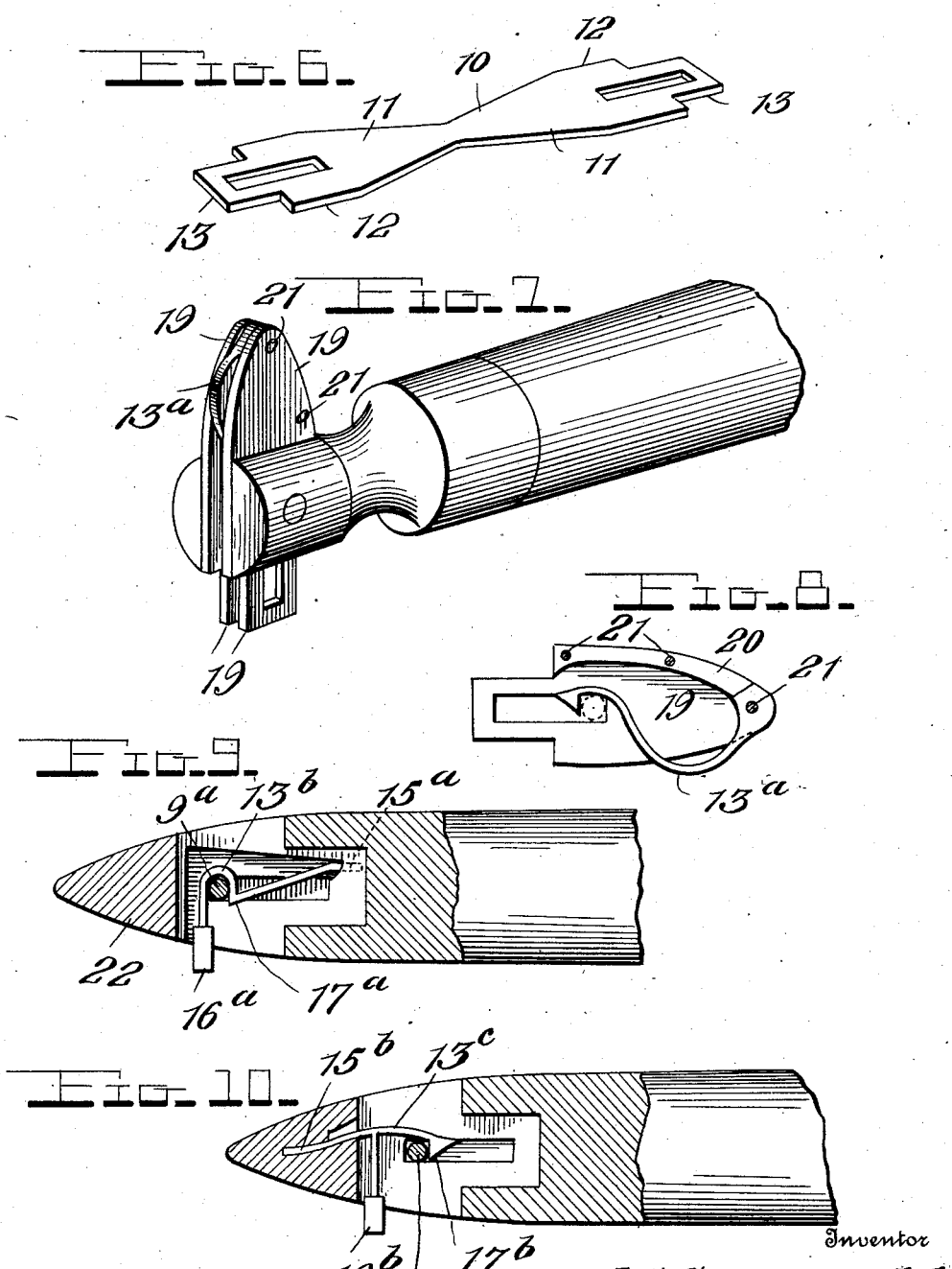

JAMES C. CRUTCHFIELD, OF GREENSBORO, NORTH CAROLINA.

TRACE-FASTENER.

973,630.  Specification of Letters Patent.  Patented Oct. 25, 1910.

Application filed January 20, 1910. Serial No. 539,086.

*To all whom it may concern:*

Be it known that I, JAMES C. CRUTCHFIELD, a citizen of the United States, residing at Greensboro, in the county of Guilford and State of North Carolina, have invented certain new and useful Improvements in Trace-Fasteners, of which the following is a specification, reference being had to the accompanying drawings.

My invention relates to improvements in trace fasteners.

The object of the invention is to provide a simple and practical device of this character consisting of a swingle tree tip so mounted that it may be turned either into longitudinal alinement with the swingle tree to serve as a guide for the trace in its application to or the removal from the swingle tree, or at right angles to the swingle tree to serve as a lock for retaining the trace on the swingle tree.

With the above and other objects in view, the invention consists of the novel construction, combination and arrangement of parts, hereinafter fully described and claimed, and illustrated in the accompanying drawings in which:—

Figure 1 is a perspective view of one end of a swingle tree showing my improved trace fastener arranged thereon and positioned to lock the trace, the latter being indicated in dotted lines; Fig. 2 is a similar view showing the guiding and locking member turned into longitudinal alinement with the swingle tree to permit of the ready application and removal of the trace; Figs. 3 and 4 are longitudinal sectional views taken on planes at right angles to each other, the guiding and locking member being in the position shown in Fig. 2; Fig. 5 is a sectional view similar to Fig. 3 but showing the guiding and locking member in its upright position for retaining the trace on the swingle tree; Fig. 6 is a perspective view of the blank from which the guiding and locking member is formed; Fig. 7 is a view similar to Fig. 1 but showing a slightly modified form of the guiding and locking member; Fig. 8 is a sectional view through the guiding and locking member shown in Fig. 7; and Figs. 9 and 10 are sectional views through other modified forms of the invention.

Referring to the drawings by numeral, 1 denotes a portion of a swingle tree or similar trace carrier, and 2 denotes a body portion of my improved trace fastener or connection, said body portion being here shown as formed separate from the swingle tree and secured thereto, although it will be understood that it may be integral with the swingle tree if desired. This body portion 2 is here shown as having a reduced outer end 3 containing a notch or groove 4 which forms a seat for the trace, the latter being indicated by the numeral 5. The reduced end 3 is formed with a centrally arranged, inwardly extending, notch 6 which also extends vertically and has formed in its bottom a recess or seat 7. The recess 6 divides the end 3 into spaced ears or lugs 8, between which is arranged a forwardly and rearwardly extending pivot pin 9 for a longitudinally slotted trace guiding and locking member 10. This member may be variously constructed but as illustrated in Figs. 1 to 6 inclusive of the drawings it comprises a head 11, a reduced stem or shank 12, and a further reduced tongue or tenon 13, the latter being adapted to enter the seat or socket 7 when the stem 12 enters the recess 6 in the body member 2. The head 11 is preferably tapered both longitudinally and transversely so that it is wedge shaped or arrow shaped for the purpose of permitting the trace to be readily applied to or removed from the body member 2 when said member 10 is turned into longitudinal alinement with the latter. Said member 10 is also preferably made from a piece of sheet steel or other metal by cutting a blank as shown in Fig. 6, and then bending its reduced central portion upon itself to provide the tapered head 11, and then further bending inwardly or offsetting the two ends of the piece to provide the parts 12, 13. While this is the preferred manner of constructing the member 10 I wish it understood that it may be otherwise constructed.

For the purpose of retaining the guiding and locking member 10 in either of its two positions I provide a suitable catch which is preferably carried by said member and adapted to co-act with the pivot pin 9. This catch which is designated generally by the numeral 14, as shown in Figs. 1 to 5 inclusive, is formed from a leaf spring which has one end secured by a rivet or other fastening 15 in the reduced outer end of the head 11, its intermediate portion curved longitudinally to provide a finger piece 16, and its free end shaped to provide a shouldered hook 17 adapted to engage with the pin 9.

The curved portion or finger piece 16 projects slightly beyond the side edge of the head 11 so that it can be pressed inwardly by the thumb or one of the fingers of the hand which grasps the member 10, and thereby spring the hook 17 out of engagement with the pin 9. It will be noted that the catch 13 is so constructed and arranged that it will engage the pin 9 in either of the two positions of the member 10 and thereby retain said member in either of its positions. If desired the end of the spring 14 which is riveted may be extended and curved to provide a resilient brace 18 to bear against the inner face of the curved portion 16.

Instead of constructing the member 10 from a single piece of metal it may be formed from two similar side pieces 19 and an intermediate spacing piece 20, as shown in Figs. 7 and 8 of the drawings. In such case transverse rivets 21 unite the parts 19, 20, and one of said rivets serves to fasten the spring catch 13ª.

Instead of making the trace guiding and locking member 10 hollow and of sheet metal, said member may be made solid as indicated at 22 in Fig. 9 of the drawings. When the member 10 is thus constructed the spring catch 13ᵇ is of substantially right angular shape and is seated in a recess in one face of the guiding and locking member. This spring 13ᵇ has one end fixed as at 15ª, and its other end provided with a push button finger piece 16ª, its intermediate portion being provided with a shoulder or hook 17ª for engagement with the pin 9ª.

In Fig. 10 of the drawing I have shown still another modified form of the invention which is similar to the one shown in Fig. 9 but which has a different form of spring catch. This catch 13ᶜ consists of a spring having one end secured in the solid outer portion of the guiding and locking member as shown at 15ᵇ, and its other end formed with a shoulder or hook 17ᵇ adapted to engage the pin 9ᵇ. The intermediate portion of the spring 13ᶜ has a laterally projecting branch or arm 16ᵇ which carries a projecting head or push button adapted to be pressed inwardly to release the catch from the pin.

In use, when it is desired to apply the trace to a swingle tree or remove it therefrom the member 10 is turned into longitudinal alinement with the member 2 and swingle tree, as shown in Fig. 2 so that the trace may be readily passed over the member 10 and engaged with the notch or seat 4, or disengaged from said parts. After the trace has been applied or engaged with the seat 4 and the member 2, the head 11 of the member 10 is grasped with the thumb bearing upon the finger piece 16 of the catch, and while said finger piece is pressed inwardly to disengage the hook 17 from the pin 9 the member 10 is pulled outwardly to disengage its tongue 13 from the recess 7, and said member is then swung upwardly to the perpendicular position shown in Fig. 2. When in this upright position the member is pushed downwardly to cause the spring catch to again engage the pin 9 and thereby lock the member 10 in such upright position. When in the latter position it will effectively prevent the trace from slipping off of the body member 2 and it can not possibly work loose and swing over into longitudinal alinement with the swingle tree, in which position it must be placed before the trace can be removed.

The construction and operation of the several modified forms of the invention will be readily understood from the foregoing explanation taken in connection with the drawing, and it is therefore thought that further description is unnecessary.

Various changes in the form, proportion and arrangement of parts may be made within the spirit and scope of the invention.

Having thus described the invention, what is claimed is:

1. A trace fastener comprising a member having a trace-receiving end formed with a vertically extending recess, the inner wall of said recess having an inwardly extending seat, a pivot pin arranged in said recess, a trace guiding and locking member slotted to receive said pivot pin and having a reduced end to enter said seat in the recess when the two members are in longitudinal alinement, and a movable shouldered dog carried by the trace guiding and locking member and movable with respect thereto, whereby it may be moved into or out of engagement with said pivot pin.

2. A trace fastener comprising a member having a trace-receiving end formed with a vertically extending recess, the inner wall of said recess having an inwardly extending seat, a pivot pin arranged in said recess, a trace guiding and locking member slotted to receive said pivot pin and having a reduced end to enter said seat in the recess when the two members are in longitudinal alinement, and a spring dog carried by the trace guiding and locking member and having a shouldered portion to engage said pivot pin and a finger piece whereby it may be moved to retract its shouldered portion from engagement with said pivot pin.

3. A trace fastener comprising a member having a trace-receiving end formed with a vertically extending recess, the inner wall of said recess having an inwardly extending seat, a pivot pin arranged in said recess, a trace guiding and locking member slotted to receive said pivot pin and having a reduced end to enter said seat in the recess when the two members are in longitudinal alinement, and a dog arranged within said trace guiding and locking member and composed of a longitudinally curved spring secured in the last mentioned member, and provided with a beveled face and a shoulder for engagement with said pivot pin, the longitudinally curved portion of said spring dog projecting beyond the side face of said member to form a finger piece.

4. A trace fastener comprising a member having a trace-receiving end formed with a vertically extending recess, the inner wall of said recess having an inwardly extending seat, a pivot pin arranged in said recess, a trace guiding and locking member slotted to receive said pivot pin and having a reduced end to enter said seat in the recess when the two members are in longitudinal alinement, and a locking dog arranged within said trace guiding and locking member and composed of a leaf spring having its intermediate portion fixed in the outer end of the last mentioned member, one end of said spring being curved longitudinally to provide a projecting finger piece and its extremity being formed with a beveled face and a shoulder for engagement with said pivot pin, and the other end of said spring being curved and engaged with the finger piece to provide a resilient brace.

5. A trace holder comprising a member having a trace-receiving end formed with a recess, the inner wall of said recess containing an inwardly extending seat, a pivot pin arranged in said recess, a trace guiding and locking member formed from a strip of sheet metal folded upon itself at its center and bent to form a tapered body portion and a reduced end, the reduced end being slotted longitudinally and having a portion to enter said seat in the recess of the first mentioned member, the formation of said reduced end of the trace guiding and locking member providing a shoulder for engagement with the outer extremity of the first mentioned member, and a beveled and shouldered spring pawl carried by the trace guiding and locking member for engagement with said pivot pin.

In testimony whereof I hereunto affix my signature in the presence of two witnesses.

JAMES C. CRUTCHFIELD.

Witnesses:
J. M. ALLROD,
A. R. HINSHAW.